United States Patent [19]

Sakurai et al.

[11] Patent Number: 4,597,482

[45] Date of Patent: Jul. 1, 1986

[54] CONTROL DEVICE FOR A DIRECT-COUPLING HYDRAULIC CLUTCH IN A HYDRAULIC TORQUE CONVERTER

[75] Inventors: Yoshimi Sakurai, Tanashi; Takashi Aoki, Fujimi; Masao Nishikawa, Tokyo, all of Japan

[73] Assignee: Honda Giken Kogyo K.K., Tokyo, Japan

[21] Appl. No.: 655,026

[22] Filed: Sep. 26, 1984

[30] Foreign Application Priority Data

Sep. 28, 1983 [JP] Japan .................. 58-149836[U]

[51] Int. Cl.⁴ .................................................. F16D 21/04
[52] U.S. Cl. ........................... 192/0.052; 192/0.076; 192/3.31; 192/3.57
[58] Field of Search .......... 192/0.052, 0.076, 0.092, 192/3.31, 3.57, 3.58; 74/731, 732

[56] References Cited

U.S. PATENT DOCUMENTS

| | | | |
|---|---|---|---|
| 3,682,043 | 8/1972 | Bailey et al. | 192/3.57 X |
| 3,857,302 | 12/1974 | Morris | 192/3.57 X |
| 4,253,553 | 3/1981 | Yamada et al. | 192/0.076 X |
| 4,270,636 | 6/1981 | Sunohara et al. | 192/3.31 |
| 4,377,226 | 3/1983 | Chevalier et al. | 192/3.31 X |
| 4,448,293 | 5/1984 | Maeda | 192/3.57 X |
| 4,457,413 | 7/1984 | Hattori | 192/0.092 X |
| 4,462,490 | 7/1984 | Hattori | 192/0.076 |
| 4,529,070 | 7/1985 | Kobayashi | 192/3.31 X |

Primary Examiner—Kenneth J. Dorner
Assistant Examiner—Dwight G. Diehl
Attorney, Agent, or Firm—Arthur L. Lessler

[57] ABSTRACT

A control device for controlling the operation of a direct-coupling hydraulic clutch of a hydraulic torque converter for use in an automotive vehicle, wherein the hydraulic torque converter is coupled to a transmission of the automotive vehicle selectable at a plurality of transmission gear ratios. A first fluid line is connected to the direct-coupling hydraulic clutch for supplying same with operating fluid pressure generated by an operating fluid pressure source. A selector valve is arranged across the first fluid line and shiftable to a first or a second position thereof in response to a transmission gear ratio established by the transmission, and is adapted to open the first fluid line when it assumes the first or second position, and to close the first fluid line when it assumes a third position between the first and second positions. A second fluid line branches off from the first fluid line at a location between the selector valve and the direct-coupling hydraulic clutch and communicates with a zone under lower pressure, and across which the selector valve is arranged. The selector valve has a valve operable to close the second fluid line when the first or second position is assumed, and to open the second fluid line to thereby escape operating oil pressure to the zone under lower pressure when the third position is assumed. Preferably, at least one restriction is arranged in the first fluid line at a location between the junction of the first and second fluid lines and the operating fluid pressure source.

2 Claims, 7 Drawing Figures

| FIG.2A | FIG.2B |

CONTROL DEVICE FOR A DIRECT-COUPLING HYDRAULIC CLUTCH IN A HYDRAULIC TORQUE CONVERTER

BACKGROUND OF THE INVENTION

This invention relates to a control device for a direct-coupling hydraulic clutch provided in a hydraulic torque converter of an automative vehicle, and more particularly to a control device of this kind which is adapted to control the operation of the direct-coupling hydraulic clutch at changeover of the transmission gear ratio or gear shifting of a transmission coupled to the hydraulic torque converter.

A direct-coupling hydraulic clutch in a hydraulic torque converter of an automotive vehicle is already known, which is adapted to mechanically lock up the torque converter to reduce the slip loss to a minimum required value when the amplification of torque performed by the torque converter is almost not available, to thereby curtail the fuel consumption during driving of the vehicle. However, at gear-shifting operation of a transmission which is coupled to the torque converter in line therewith, the locking-up of the torque converter should be temporarily interrupted so that shocks caused upon gear-shifting desirably are absorbed by the torque converter. To this end, a control device for the direct-coupling hydraulic clutch has been proposed by the assignee of the present application, which is equipped with a selector valve operable in response to the pressure of operating oil outputted from an oil hydraulic servo mechanism which establishes a certain speed reduction ratio of the transmission, to assume one of first and second operating positions to be assumed, respectively, before and after establishment of the speed reduction ratio, or a third or transitional position intervening between the first and second operating positions. In the first or second position, the selector valve communicates the direct-coupling clutch with an operating oil source which supplies the operating oil, while in the third position, it communicates the direct-coupling clutch with a tank for returning the operating oil.

However, it is sometimes required to arrange, together with the above proposed selector valve, various other control valves in a fluid line extending between the selector valve and the direct-coupling clutch for the convenience of designing the hydraulic circuit, such control valves including a modulator valve which controls the engaging force of the direct-coupling clutch in response to the vehicle speed and/or the throttle valve opening, so as to release the torque converter from the completely locked-up state in a particular engine operating region to allow slippage within the torque converter for absorption of engine vibrations occurring in such operating region, and an idle relief valve which interrupts the locking-up of the torque converter upon detection of the full closing of the throttle valve, to thereby ensure smooth driving of the vehicle while the engine is at idle. To arrange the various control valves in the fluid line between the selector valve and the clutch necessitates prolonging the fluid line, resulting in increased flow resistance in the fluid line. Due to this increased flow resistance as well as to flow resistance of the above control valves per se, there takes place pressure loss in the operating oil supplied to the direct-coupling clutch, causing a response lag in the operation of the direct-coupling clutch, which makes it difficult to interrupt the locking-up of the torque converter in immediate response to gear-shifting which usually is effected within a very short period of time. This difficulty becomes serious particularly when the viscosity of operating oil is high, such as at the start of the engine in cold weather. Therefore, it is desirable to interrupt engagement of the direct-coupling clutch as immediately as possible after the gear-shifting operation has been started.

On the other hand, after the gear-shifting operation has been completed, reengagement of the direct-coupling clutch should be effected with a proper time delay. An electronic control device which electronically controls such a direct-coupling clutch would be capable of easily setting the timing of reengagement of the direct-coupling clutch after the gear-shifting operation so as to provide a suitable time delay between the completion of the gear-shifting operation and the reengagement of the clutch. However, such electronic control device in general is expensive.

SUMMARY OF THE INVENTION

It is an object of the invention to provide a control device for a direct-coupling hydraulic clutch of a hydraulic torque converter, which provides the clutch with improved responsiveness to the gear-shifting operation of the transmission to allow the torque converter to absorb gear-shifting shocks for mitigation thereof, and which has a simple structure and therefore low in production cost.

Another object of the invention is to provide a control device for a direct-coupling hydraulic clutch of a hydraulic torque converter, which is adapted to establish engagement of the clutch with a suitable time delay after completion of a gear-shifting operation of the vehicle transmission, thereby mitigating the gear-shifting shock.

The present invention provides a control device for controlling the operation of a direct-coupling hydraulic clutch of a hydraulic torque converter for use in an automotive vehicle, wherein the hydraulic torque converter has an input member and an output member and is coupled to a transmission of the automotive vehicle, selectable at a plurality of transmission gear ratios. The direct-coupling hydraulic clutch is arranged between the input and output members of the hydraulic torque converter and operable to mechanically engage the input and output members with each other. The control device comprises an operating fluid pressure source for generating operating fluid pressure, a first fluid line connected to the direct-coupling hydraulic clutch for supplying same with operating fluid pressure from the operating fluid source, and selector valve means arranged across the first fluid line and shiftable to a first or a second operating position thereof in response to a transmission gear ratio established by the transmission, the selector valve means being adapted to open the first fluid line when it assumes the first or second position, and to close the first fluid line when it assumes a third position thereof intervening between the first and second positions. The control device of the invention is characterized by further including a second fluid line branching off from the first fluid line at a location between the selector valve means and the direct-coupling hydraulic clutch and communicating with a zone under lower pressure, the selector valve means being arranged across the second fluid line. The selector valve means has a valve operable to close the second fluid line when the first or second position is assumed, and to open the second fluid line to thereby cause escape of operating oil pressure through the second fluid line to the zone under lower pressure when the third position is assumed.

Preferably, the control device includes at least one restriction means arranged in the first fluid line at a location between the junction of the first fluid line with the second fluid line and the operating fluid pressure source.

The above and other objects, features and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
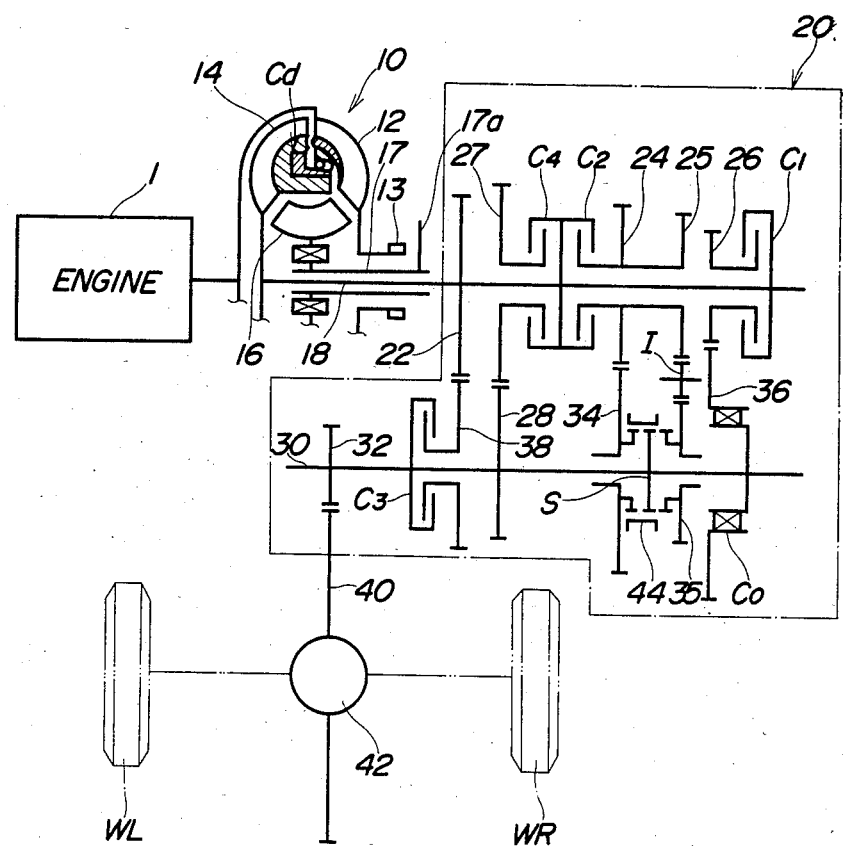
FIG. 1 is a schematic view of an automatic transmission for automotive vehicles, to which is applied the control device for a direct-coupling clutch according to the invention.

FIG. 1 schematically illustrates the arrangement of an automatic transmission for automotive vehicles, to which the invention is applied. Output from an engine 1 is first transmitted to a pump 12 of a hydraulic torque converter (hereinafter merely called "the torque converter") 10, and then to a turbine 14 in a hydrodynamic manner. When amplification of torque takes place within the torque converter 10 due to a difference in the rotational speed between the pump 12 and the turbine 14, the resulting reaction force is borne by a stator 16. A gear 13 is mounted on the pump 12 for driving an oil hydraulic pump 50 appearing in FIG. 2. When the reaction force acting upon the stator 16 exceeds a predetermined value, a stator shaft 17 rotates and urges a regulator valve 51 appearing in FIG. 2 with an arm 17a provided at one end of the stator shaft 17, to thereby increase fluid line pressure, i.e. discharge pressure of the oil hydraulic pump 50, as hereinafter described in detail.

Figures 2, 2A:
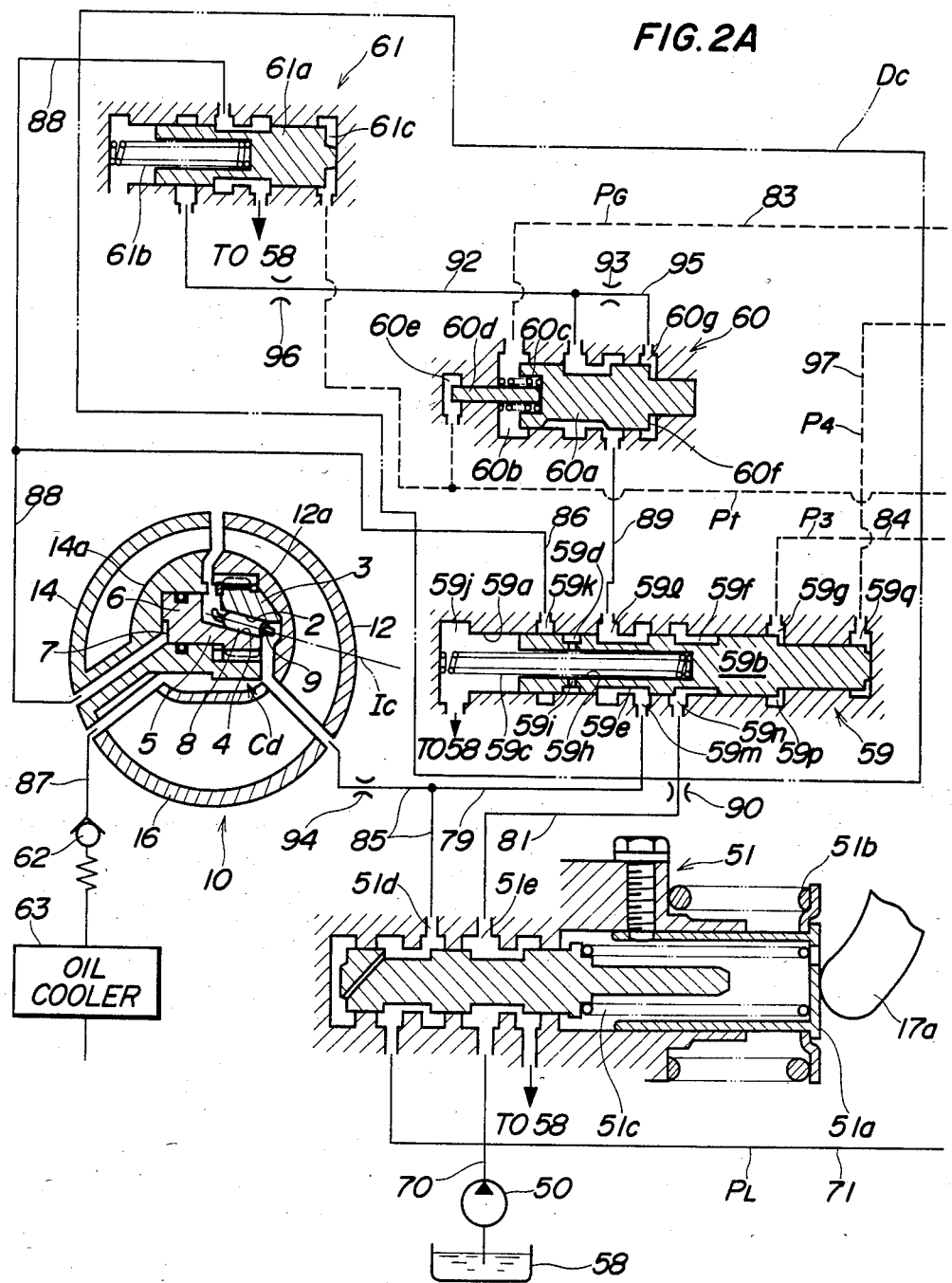
FIGS. 2, 2A and 2B constitute a circuit diagram illustrating a hydraulic control system employed in the automatic transmission shown in FIG. 1, in which is incorporated the control device according to one embodiment of the invention.
Figure 2B:
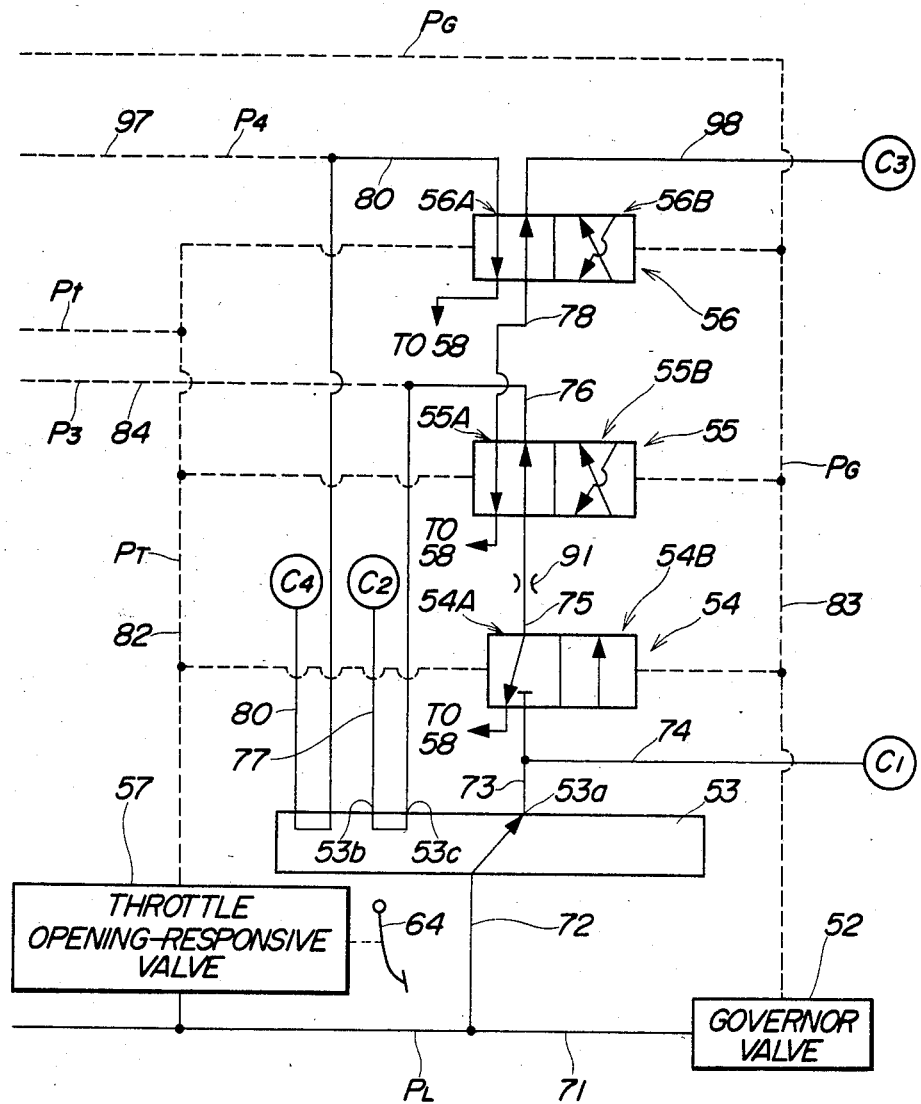

Interposed between the pump 12 and the turbine 14 of the torque converter 10 is a direct-coupling hydraulic clutch Cd which is, as shown in FIG. 2 in greater detail, constructed as follows: An annular driving member 3 having a driving conical surface 2 at its inner periphery is secured to an inner peripheral wall 12a of the pump 12, while an annular driven member 5, which has a driven conical surface 4 at its outer periphery extending parallel with the driving conical surface 2, is slidably spline-fitted in an inner peripheral wall 14a of the turbine 14 for axial movement relative thereto. The driven member 5 has its one end formed integrally with a piston 6 which is slidably received within an oil hydraulic cylinder 7 formed in the inner peripheral wall 14a of the turbine 14. The piston 6 receives a pressure in the cylinder 7 and a pressure in the torque converter 10 at the same time, at its both or left and right end faces, respectively.

Figure 3:
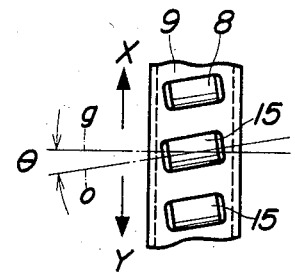
FIG. 3 is a development of essential part of the direct-coupling clutch appearing in FIG. 2.

Cylindrical clutch rollers 8 are interposed between the driving and driven conical surfaces 2, 4 and retained in place by an annular retainer 9 in such a manner that, as shown in FIG. 3, the clutch rollers 8 each have its axis o inclined by a predetermined angle $\theta$ relative to the generating line g of a virtual conical surface Ic, shown in FIG. 2, which extends between the conical surfaces 2, 4 along the middle thereof.

When the torque converter 10 is not required to amplify the torque transmitted thereto, an oil pressure which is higher than the internal pressure of the torque converter 10 is supplied to the cylinder 7 to cause the piston 6, i.e. the driven member 5, to move toward the driving member 3, whereby the clutch rollers 8 are urgedly held between the conical surfaces 2, 4. With the clutch rollers 8 thus urgedly held between the conical surfaces 2, 4, if output torque from the engine 1 acts upon the driving member 3 to cause same to rotate in the direction indicated by the arrow X in FIG. 3 relative to the driven member 5, the clutch rollers 8 rotate about their own axes to cause relative axial displacement of the members 3, 5 in a direction such that the members 3, 5 approach toward each other, since the axis o of each clutch roller 8 is inclined relative to the generating line g, as hereinbefore described. Consequently, the clutch rollers 8 bitingly engage with the conical surfaces 2, 4 to establish mechanical coupling between the members 3 and 5, i.e. between the pump 12 and the turbine 14 of the torque converter 10.

Even on this occasion, if engine output torque exceeding the coupling force of the direct-coupling clutch Cd is applied between the pump 12 and the turbine 14, the clutch rollers 8 can slip on the conical surfaces 2, 4 to divide the engine output torque into two parts, wherein part of the torque is mechanically transmitted through the direct-coupling clutch Cd while the remaining torque is hydrodynamically transmitted from the pump 12 to the turbine 14. Therefore, the ratio between the mechanically transmitted torque and the hydrodynamically transmitted torque is variable dependent on the degree of slipping of the clutch rollers 8.

On the other hand, if a reverse load is applied to the torque converter 10 during operation of the direct-coupling clutch Cd, the rotational speed of the driven member 5 becomes larger than that of the driving member 3, that is, the driving member 3 rotates in the direction indicated by the arrow Y in FIG. 3 relative to the driven member 5. Consequently, the clutch rollers 8 rotate in a direction reverse to that mentioned above, to cause relative axial displacement of the members 3, 5 in a direction of moving the members 3, 5 away from each other. Thus, the clutch rollers 8 are released from biting engagement with the conical surfaces 2, 4 to run idle so that the reverse load is transmitted from the turbine 14 to the pump 12 only in a hydrodynamic manner.

As the cylinder 7 is released from the oil pressure, the piston 6 is displaced to its initial position by the internal pressure of the torque converter 10 acting thereupon, thus rendering the direct-coupling clutch Cd inoperative.

Reverting to FIG. 1, the torque converter 10 has an output shaft 18 also serving as an input shaft of an auxiliary transmission 20. Mounted on the output shaft 18, i.e. the input shaft of the auxiliary transmission 20, are a third-speed driving gear 22, a fourth-speed clutch C4, a second-speed clutch C2, and a first-speed clutch C1, which are arranged in the order mentioned from left to right in the figure. Freely fitted on the input shaft 18 are a fourth-speed driving gear 27, a second-speed driving gear 24 and a first-speed driving gear 26 which are disposed to rotate in unison with the input shaft 18 when the clutches C4, C2 and C1 become engaged, respectively. A reverse driving gear 25 is formed integrally with the second-speed driving gear 24.

A countershaft 30 extends parallel with the input shaft 18 and is provided with a final driving gear 32, a third-speed clutch C3, a fourth-speed driven gear 28, a spline S selectively engageable with a second-speed driven gear 34 or with a reverse driven gear 35, and a first-speed driven gear 36, which are arranged in the order mentioned from left to right in FIG. 1. A one-way clutch C0 is arranged between the first-speed driven gear 36 and the countershaft 30, to permit transmission of engine torque only in a direction of causing rotation of driving wheels WL and WR of the vehicle. A third-speed driven gear 38 is freely fitted on the countershaft 30 and adapted to rotate in unison therewith when the third-speed clutch C3 becomes engaged. The reverse gears 25 and 35 engage with each other through an idle gear I.

Driving torque is transmitted from the final driving gear 32 to a final driven gear 40 engaging therewith, and then to the left and right driving wheels WL, WR through a differential gear 42 formed integrally with the final driven gear 40. Incidentally, to drive the vehicle in reverse, a selector sleeve 44 which is disposed around the countershaft 30 is shifted to the right as viewed in the figure, by means of a shift fork, not shown, to engage the countershaft 30 with the reverse driven gear 35, and at the same time the second-speed clutch C2 is engaged. Thus, engine torque is transmitted to the left and right driving wheels WL, WR to drive the vehicle in reverse.

Referring now to FIG. 2, the oil hydraulic pump 50 is disposed to be driven by the pump 12 of the torque converter 10, as mentioned hereinbefore, for sucking oil from a tank 58 for pressure delivery of same through a fluid line 70 to the regulator valve 51 wherein operating oil has its pressure regulated to a predetermined level. Thereafter, oil is delivered to the torque converter 10, a selector valve 59, a manual shift valve 53, a throttle opening-responsive valve 57, and a governor valve 52. The regulator valve 51 has a spring-receiving cylinder 51a disposed in urging contact with the aforementioned stator arm 17a of the stator shaft 17 appearing in FIG. 1. The cylinder 51a is displaced leftward as viewed in FIG. 2 when the reaction force acting upon the stator 16 exceeds a certain value, in other words, the rate of torque amplification performed by the torque converter 10 exceeds a certain level. As a stator spring 51b of the regulator valve 51 is compressed due to the leftward displacement of the cylinder 51a, the setting load of a pressure control spring 51c is increased, to thereby increase the discharge pressure PL of the oil hydraulic pump 50 (hereinafter referred to as "the line pressure PL").

Having been regulated to a predetermined pressure value by the regulator valve 51, the pressurized oil is in part delivered from an outlet port 51d of the regulator valve 51 to the torque converter 10 through a fluid line 85 provided with a restriction 94, to increase the internal pressure of the torque converter 10 for prevention of occurrence of cavitation therein, as well as to cool same. The torque converter 10 is connected at its outlet to a fluid line 87 which is provided with a check valve 62 and an oil cooler 63, to return oil to the tank 58 therethrough. A fluid line 79 branches off from the fluid line 85 for delivering pressurized oil to the selector valve 59. The selector valve 59 is also supplied with pressurized oil from an outlet port 51e of the regulator valve 51 through a fluid line 81 provided with a restriction 90, as hereinafter referred to.

A fluid line 72 branches off from a fluid line 71 connected to the oil hydraulic pump 50, and leads to the manual shift valve 53 for supply of operating oil thereto. The manual shift valve 53 is adapted to prohibit delivery of pressurized oil to any of the clutches C1 through C4 connected thereto, when it is in a neutral (N) position, and to deliver oil from its outlet port 53a to the first-speed clutch C1 through a fluid line 73 and a fluid line 74 branching off therefrom, and further to the clutch C2, C3 or C4, depending on the positions of first, second and third shift valves 54, 55 and 56, when the manual shift valve 53 assumes a forward or drive (D) position. When the manual shift valve 53 assumes either a second (2) position or a reverse (R) position, the outlet port 53a is closed and an outlet port 53b is opened instead, to supply operating oil to the second-speed clutch C2 alone.

When the manual shift valve 53 is in the above drive (D) position, the speed reduction ratio of the auxiliary transmission 20 is selected in dependence on the vehicle speed and the valve opening of a throttle valve, not shown, arranged in an intake passage of the engine 1, in the following manner: The throttle opening-responsive valve 57 generates a throttle pressure PT corresponding to the stepping amount of an accelerator pedal 64 of the engine 1, i.e. the valve opening of the throttle valve, and applies same to spools of the first through third shift valves 54, 55, 56 at their one end faces, through a pilot fluid line 82. ON the other hand, the governor valve 52, which is supplied with operating oil from the oil hydraulic pump 50 through the fluid line 71, generates a governor pressure PG which varies in response to the vehicle speed, i.e. in response, for instance, to the force of a spring thereof, not shown, and the centrifugal force acting upon a weight thereof, not shown, which is rotatively driven by the aforementioned final driven gear 40. The governor pressure PG is applied to the other end faces of the spools of the first to third shift valves 54, 55, 56 through a pilot fluid line 83.

Figure 4:
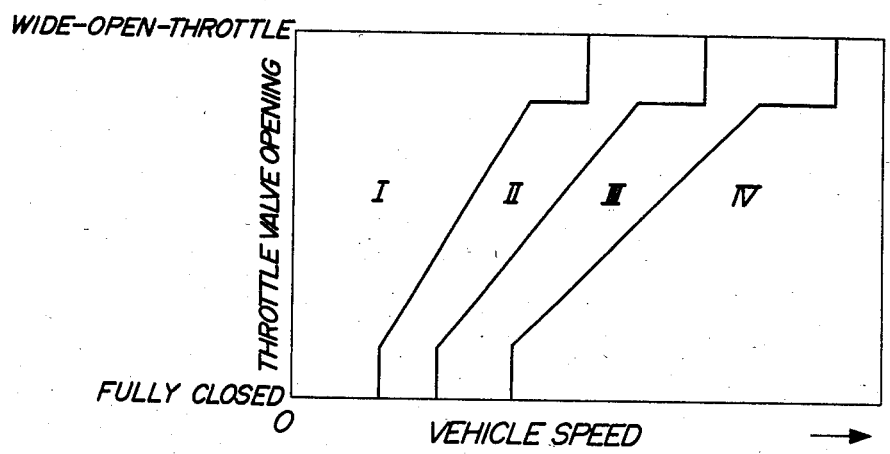
FIG. 4 is a graph showing various regions of the speed reduction ratio established by an auxiliary transmission appearing in FIG. 1, which are determined by vehicle speed, and throttle valve opening indicative of the engine load.

When the engine is operating in a first-speed region I shown in FIG. 4, which is determined as a function of the vehicle speed and the throttle valve opening indicative of the engine load, the first shift valve 54 is shifted to a position 54A as illustrated since in this first-speed region the combined force of the throttle pressure PT generated by the throttle opening-responsive valve 57 and the urging force of a spring, not shown, of the first shift valve 52 is larger than the governor pressure PG from the governor valve 52. Then, the outlet port 53a of the manual shift valve 53 is communicated with the first-speed clutch C1 alone to supply same with the line pressure PL from the oil hydraulic pump 50, thereby establishing the first-speed reduction ratio. When the operating condition of the engine shifts from the first-speed region I to a second-speed region II in FIG. 4 as the vehicle speed increases, the governor pressure PG which has increased with the increase of the vehicle speed exceeds the combined force of the throttle pressure PT and the urging force of the spring of the first shift valve 54. Accordingly, the first shift valve 54 is shifted to a position 54B to communicate the fluid line 73 with a fluid line 75 provided with an orifice 91. On this occasion, the second shift valve 55 is in a position 55A as illustrated wherein the fluid line 75 is communicated with a fluid line 76, since the combined force of the throttle pressure PT and the urging force of a spring, not shown, of the second shift valve 55 is still larger than the governor pressure PG. Consequently, the line pressure PL is supplied from the manual shift valve 53 through its outlet port 53a to the second shift valve 55 through the first shift valve 54 and then returned to an inlet port 53c of the manual shift valve 53 through the fluid line 76, and thereafter the line pressure PL is outputted from the outlet port 53b to the second-speed clutch C2 through a fluid line 77, to cause engagement of the second-speed clutch C2 for establishing the second-speed reduction ratio. Although, on this occasion, the first-speed clutch C1 is still in an engaged state, the second-speed reduction ratio can be establishment of by virtue of the action of the one-way clutch C0 appearing in FIG. 1.

When the engine operating condition is shifted from the second-speed region II to a third-speed region III in FIG. 4 as the vehicle speed further increases with the second-speed reduction ratio thus established, the governor pressure PG correspondingly increases above the combined force of the throttle pressure PT acting upon the second shift valve 54 and the urging force of the spring thereof cooperating therewith. Accordingly, the second shift valve 55 is shifted to a position 55B to communicate the fluid line 75 with a fluid line 78. On this occasion, the third shift valve 56 still assumes a position 56A wherein the fluid line 78 is communicated with a fluid line 98 connected to the third-speed clutch C3, since the combined force of the throttle pressure PT and the urging force of a spring, not shown, of the third shift valve 56 is larger than the governor pressure PG. When the second shift valve 55 assumes the position 55B, the line pressure PL that has been applied to the second-speed clutch C2 is returned to the tank 58 to interrupt the engagement of the second-speed clutch C2, and at the same time the line pressure PL is applied to the third-speed clutch C3 to establish the third-speed reduction ratio. With the third-speed reduction ratio thus established, when the engine operating condition shifts from the third-speed region III to a fourth-speed region IV in FIG. 4 with an increase in the vehicle speed, the governor pressure PG exceeds the combined force of the throttle pressure PT applied to the third shift valve 56 and the urging force of the spring thereof cooperating therewith, to change the third shift valve 56 to a position 56B. Therefore, the line pressure PL that has been applied to the third-speed clutch C3 is returned through the third shift valve 56 to the tank 58 to disengage the third-speed clutch C3, while the line pressure PL is now applied to the fourth-speed clutch C4 through a fluid line 80 to establish the fourth-speed reduction ratio.

A control device Dc for controlling the operating oil pressure to be applied to the direct-coupling clutch Cd will now be described with further reference to FIG. 2. The control device Dc comprises the aforementioned selector valve 59, a modulator valve 60, and an idle relief valve 61.

The selector valve 59 is adapted to temporarily interrupt the supply of operating oil to the oil hydraulic cylinder 7 of the direct-coupling clutch Cd upon gear-shifting operation of the auxiliary transmission 20, that is, changeover of the speed reduction ratio thereof, to temporarily interrupt the engagement of the direct-coupling clutch Cd. The selector valve 59 comprises a cylinder bore 59a, a spool 59b slidably received within the cylinder bore 59a, and a spring 59c accommodated within a left end chamber of the cylinder bore 59a and urging the spool 59b rightward as viewed in the figure. The spool 59b has its outer peripheral surface formed with first, second and third annular grooves 59d, 59e and 59f at predetermined axial locations, in the order mentioned from left to right in FIG. 2, and is further formed with a stepped shoulder 59g at its right end portion. A blind bore 59h is formed in the spool 59b along its axis, with end opening in the left end face of the spool 59b. The bore 59h communicates with the first annular groove 59d by way of through holes 59i extending radially from the bore 59h to the bottom surface of the first annular groove 59d.

On the other hand, the cylinder bore 59 has its inner peripheral surface formed at predetermined axial locations with a fourth annular groove 59j communicating with the tank 58, a fifth annular groove 59k communicating with the oil hydraulic cylinder 7 of the direct-coupling clutch Cd through a drain line 86 and a fluid line 88 hereinafter referred to, a sixth annular groove 59l communicating through a fluid line 89 with the modulator valve 60 hereinafter described in detail, a seventh annular groove 59m communicating with the outlet port 51d of the regulator valve 51 through the fluid lines 79, 85, an eighth annular groove 59n communicating with the outlet port 51e of the regulator valve 51 through the fluid line 81, a first pilot pressure chamber 59p communicating through a pilot fluid line 84 with the fluid line 76 connected to the second shift valve 55, and defined in part by the stepped shoulder 59g, and a second pilot pressure chamber 59q communicating through a pilot fluid line 97 with the fluid line 80 connected to the third shift valve 56, and defined in part by a right end face of the spool 59b. The pressure-receiving area of the spool 59b facing the first pilot pressure chamber 59p is substantially equal to that of the same spool 59b facing the second pilot pressure chamber 59q.

When the first-speed reduction ratio is established within the auxiliary transmission 20, the spool 59b of the selector valve 59 is biased to the right or illustrated position of FIG. 2, by the force of the spring 59c. Accordingly, the operating oil from the oil hydraulic pump 50 is supplied through the seventh, second and sixth annular grooves 59m, 59e, 59l and the fluid line 89 to the modulator valve 60 hereinafter referred to, and then to the oil hydraulic cylinder 7 of the direct-coupling clutch Cd through a fluid line 92 provided with a restriction 96, the open idle relief valve 61 hereinafter referred to, and the fluid line 88. Therefore, the oil hydraulic cylinder 7 of the direct-coupling clutch Cd is supplied with the operating oil which has its pressure modulated by the modulator valve 60 in such a manner as to increase with an increase in the vehicle speed to effect locking-up of the torque converter 10, as hereinafter described in detail.

The idle relief valve 61 is adapted to disconnect the fluid line 92 from the fluid line 88 to interrupt the locking-up action of the direct-coupling clutch Cd when the throttle valve, not shown, assumes an almost closed or idle position. That is, the throttle pressure PT from the throttle opening-responsive valve 57 is applied through the pilot fluid line 82 to a right end chamber 61c of the idle relief valve 61, partly defined by a right end face of a spool 61a, and when the throttle valve assumes the idle position, the urging force of a spring 61b accommodated within a left end chamber and urging the spool 61a rightward exceeds the throttle pressure PT acting upon the right end face of the spool 61a. Therefore, the spool 61a assumes the right or illustrated position of FIG. 2 to disconnect the fluid line 92 from the fluid line 88 and at the same time communicate the fluid line 88 with the tank 58. On the other hand, as the throttle valve is opened, the throttle pressure PT increases to displace the spool 61a to the left position against the urging force of the spring 61b, to thereby communicate the fluid line 92 with the fluid line 88.

The modulator valve 60 acts to increase the operating oil pressure to be applied to the oil hydraulic cylinder 7 of the direct-coupling clutch Cd, in response to an increase in the vehicle speed. More specifically, the governor pressure PG from the governor valve 52 is applied through the pilot fluid line 83 to a left end chamber 60b of the modulator valve 60, partly defined by a left end face of a spool 60a, to urge the spool 60a rightward in cooperation with a spring 60c accommodated within the left end chamber 60b. A rod 60d projects into the left end chamber 60b in axial alignment with the spool 60a and has one end face disposed for urging contact with the left end face of the spool 60a. A pressure chamber 60e, partly defined by the other end face of the rod 60d, is supplied with the throttle pressure PT from the throttle opening-responsive valve 57, to urge the spool 60a rightward through the rod 60d. The spool 60a has a stepped shoulder 60f at its right end portion, and a right end chamber 60g partly defined by the shoulder 60f is communicated with the aforementioned fluid line 92 through a fluid line 95 provided with a restriction 93. Accordingly, the operating oil pressure outputted from the modulator valve 60 per se is applied to the right end chamber 60g to urge the spool 60a leftward against the combined urging force of the governor pressure PG, the throttle pressure PT and the force of the spring 60c, acting upon the left end face of the spool 60a, whereby the spool 60a is displaced to a position where these urging forces acting upon its opposite end faces equilibrate.

When the governor pressure PG is increased with an increase in the vehicle speed and/or when the throttle pressure PT is increased with opening action of the throttle valve, the spool 60a of the modulator valve 60 is displaced rightward to increase the operating oil pressure outputted therefrom. Therefore, the urging force of the operating oil acting upon the stepped shoulder 60f is correspondingly increased to displace the spool 60a until the urging forces acting upon the opposite end faces of the spool 60a are equilibrated. Thus, the modulator valve 60 operates to increase the operating oil pressure to be applied to the direct-coupling clutch Cd, in response to an increase in the vehicle speed and-/or the throttle valve opening, to thereby obtain an engaging force of the direct-coupling clutch Cd corresponding to the vehicle speed and the throttle valve opening.

When gear shifting is effected to change the speed reduction ratio from the first speed to the second speed in the auxiliary transmission 20, the operating oil pressure PL which is applied to the second-speed clutch C2 through the first and second shift valves 54, 55 and the fluid line 76 is also applied to the first pilot pressure chamber 59p of the selector valve 59 through the fluid line 84, to act upon the spool 59b at its stepped shoulder 59g to displace same leftward. When the spool 59b of the selector valve 59 moves from the right or illustrated position to the left position, it passes an intermediate position wherein the fluid line 79 is disconnected from the fluid line 89, and at the same time the annular groove 59d of the spool 59b faces the annular groove 59k of the cylinder bore 59a whereby the operating oil that has been acting upon the oil hydraulic cylinder 7 of the direct-coupling clutch Cd is promptly drained to the tank 58 through the fluid line 88, the drain line 86, the annular groove 59k, the through holes 59i, and the bore 59h.

On this occasion, the third annular groove 59f of the spool 59b faces the annular grooves 59n, 59m of the cylinder bore 59a to communicate the fluid line 81 with the fluid line 79. That is, the torque converter 10 is supplied with operating oil not only from the outlet port 51d of the regulator valve 51 but also from the outlet port 51e of same through the fluid line 81, the selector valve 59, and the fluid lines 79, 85. Accordingly, the internal pressure of the torque converter 10 increases to urgingly displace the driven member 5 leftward as viewed in FIG. 2, thus facilitating interruption of the engagement of the direct-coupling clutch Cd as well as enhancing cooling of the torque converter 10 with an increased supply quantity of operating oil. In this manner, when the torque converter 10 is locked up by the direct-coupling clutch Cd and therefore no torque amplifying function is performed by the torque converter 10, the quantity of operating oil supplied to the torque converter 10 is restrained to a minimum required value, whereas only when the locking-up of the torque converter 10 is interrupted, the oil quantity for supply to the torque converter 10 is increased, thus reducing the quantity of oil wastefully drained to the tank 58, and thereby making it possible to design the oil hydraulic pump 50 small in capacity.

When the spool 59b of the selector valve 59 is further displaced toward the left position from the intermediate position by the operating oil pressure P3 acting upon the stepped shoulder 59g, the drain line 86 and the fluid line 81 are both blocked by the valve 59 again, and at the same time the fluid line 79 is communicated with the fluid line 89 through the annular groove 59f of the spool 59b to restart supply of operating oil to the direct-coupling clutch Cd.

When gear shifting is effected to change the speed reduction ratio from the second speed to the third speed in the auxiliary transmission 20, the second shift valve 55 is shifted from the position 55A to the position 55B to communicate the first pilot pressure chamber 59p of the selector valve 59 with the tank 58. Therefore, the operating oil pressure acting upon the stepped shoulder 59g of the spool 59b becomes zero to cause the spool 59b to be biased to the right or illustrated position by the force of the spring 59c. While the spool 59b moves from the left position to the right position, the direct-coupling clutch Cd is temporarily released from engagement at the intermediate position of the spool 59b, that is, at changeover in engagement from the second-speed clutch C2 to the third-speed clutch C3, in a similar manner to that from the first-speed clutch C1 to the second-speed clutch C2, previously stated.

When gear shifting is further effected from the third speed to the fourth speed in the auxiliary transmission 20, an operating oil pressure P4 which is applied to the fourth-speed clutch C4 is also applied to the second pilot pressure chamber 59q of the selector valve 59 through the pilot fluid line 97 branching off from the fluid line 80. Thus, the operating oil pressure acts upon the spool 59b at its right end face to displace same leftward, thereby temporarily interrupting the engagement of the direct-coupling clutch Cd in a manner similar to the changeover from the first-speed reduction ratio to the second-speed reduction ratio.

The restriction 96 provided in the fluid line 92 functions as follows: While the restriction 96 does not affect the drainage of operating oil from the oil hydraulic cylinder 7 of the direct-coupling clutch Cd, the restriction 96 which the operating oil passes serves to delay the establishment of high operating oil pressure within the oil hydraulic cylinder 7, when the fluid lines 79 and 89 are communicated with each other through the selector valve 59 after completion of a gear-shifting operation, thereby prolonging the time of disengagement of the direct-coupling clutch Cd after completion of the gear-shifting operation.

Figure 5:
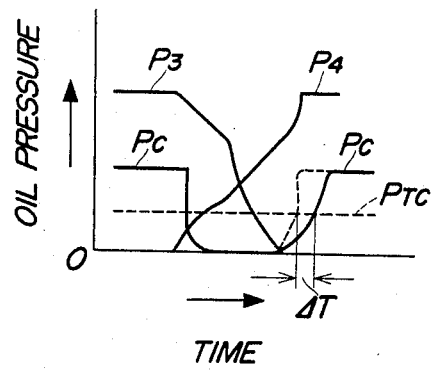
FIG. 5 is a timing chart showing changes in the pressure of operating oil supplied to the direct-coupling clutch.

The operation of the restriction 96 will be described with reference to FIG. 5. For instance, at gear shifting from the third-speed reduction ratio to the fourth-speed reduction ratio wherein the operating oil pressure P3 for the third-speed clutch C3 decreases and the operating oil pressure P4 for the fourth-speed clutch C4 increases, the operating oil pressure PC applied to the direct-coupling clutch Cd is temporarily reduced due to drainage of operating oil from the clutch Cd, and when the same pressure PC drops below the internal pressure PTC of the torque converter 10, the direct-coupling clutch Cd is released from engagement. Thereafter, although the operating oil pressure PC increases with an increase in the operating oil pressure P4 for the fourth-speed clutch C4, the rate of increase of the operating oil pressure PC is smaller than that obtained by the conventional arrangement, indicated by the dotted line in FIG. 5, thus delaying the increase of the operating oil pressure PC above the internal pressure PTC of the torque converter 10 for reengagement of the direct-coupling clutch Cd, by a period of time $\Delta T$ as compared with the conventional arrangement.

To obtain the above-mentioned function of the restriction 96, the restriction 96 is arranged at a location upstream of the junction of the fluid line 88 with the fluid line 86. Alternatively of the illustrated arrangement, the restriction 96 may be arranged in the fluid line 88 at a location between the above junction and the idle relief valve 61, or in the fluid line 89 or 79. By any of these arrangements according to the invention, the reengagement of the clutch Cd can be delayed after completion of a gear-shifting operation, while achieving prompt interruption of engagement of the clutch Cd upon starting such gear-shifting operation as in the illustrated arrangement.

The same function as those of the restriction 96 may be achieved by arranging a one-way restrictor valve composed of a one-way valve and a restriction at a location downstream of the junction of the fluid line 88 with the fluid line 86, i.e. between the same junction and the torque converter 10. The addition of the one-way valve merely makes the hydraulic circuitry complicate with less operational stability than the provision of the restriction 96 alone.

As described above, the selector valve 59 serves to temporarily interrupt the engagement of the direct-coupling clutch Cd at changeover of the speed reduction ratio as well as to increase the quantity of operating oil supplied to the direct-coupling clutch Cd upon disengagement of the direct-coupling clutch Cd. To positively exhibit these functions as well as to simplify the hydraulic circuitry, the selector valve 59 is arranged downstream of the regulator valve 51 and upstream of the modulator valve 60.

Although in the above described embodiment, the drain line 86 branches off from the fluid line 88, it may alternatively branch off from the fluid line 92 between the idle relief valve 61 and the modulator valve 60, if required.

What is claimed is:

1. A control device for controlling the operation of a direct-coupling hydraulic clutch of a hydraulic torque converter for use in an automotive vehicle, said hydraulic torque converter having an input member and an output member and being coupled to a transmission of said automotive vehicle selectable at a plurality of transmission gear ratios, said direct-coupling hydraulic clutch being arranged between said input and output members of said hydraulic torque converter and operable to mechanically engage said input and output members with each other, said control device comprising:

an operating fluid pressure source for generating operating fluid pressure;

first fluid line means coupled between said operating fluid pressure source and said direct-coupling hydraulic clutch for supplying said clutch with fluid pressure derived from said operating fluid pressure source;

selector valve means disposed in the path of said first fluid line means and shiftable to a first or a second position thereof in response to a transmission gear ratio established by said transmission, said selector valve means being adapted to open said first fluid line means to said direct-coupling hydraulic clutch when said selector valve assumes said first or second position, and to close said first fluid line means when said selector valve assumes a third position thereof intervening between said first and second positions; and a second fluid line branching off from said first fluid line means at a location between said selector valve means and said direct-coupling hydraulic clutch and communicating with a tank, said selector valve means being arranged across said second fluid line;

said selector valve means having a valve operable to close said second fluid line when said first or second position is assumed, said valve being operable to open said second fluid line to drain the same when said third position is assumed, to thereby cause escape of operating oil pressure to said tank, thereby disengaging said direct-coupling hydraulic clutch during the shifting of said transmission between said transmission gear ratios, thus mitigating gear-shifting shocks.

2. A control device as claimed in claim 1, including at least one restriction means arranged in said first fluid line means at a location between the junction of said first fluid line means with said second fluid line and said operating fluid pressure source.

* * * * *